United States Patent [19]

Eyler et al.

[11] Patent Number: 4,503,473
[45] Date of Patent: Mar. 5, 1985

[54] DUAL PURPOSE HEAD CLEANER

[75] Inventors: Stanley Eyler, Tarzana; Timothy Hume, Simi Valley, both of Calif.

[73] Assignee: Head Computer Products, Inc., Tarzana, Calif.

[21] Appl. No.: 475,454

[22] Filed: Mar. 15, 1983

[51] Int. Cl.³ .............................................. G11B 5/41
[52] U.S. Cl. .................................... 360/128; 360/133
[58] Field of Search ................... 360/128, 133, 97–99, 360/137

[56] References Cited

U.S. PATENT DOCUMENTS

| | | | |
|---|---|---|---|
| 4,374,404 | 2/1983 | Davis | 360/128 |
| 4,400,753 | 8/1983 | Beebe et al. | 360/133 |

FOREIGN PATENT DOCUMENTS 2091472  7/1982  United Kingdom ................ 360/128

Primary Examiner—John H. Wolff
Attorney, Agent, or Firm—Poms, Smith, Lande & Rose

[57] ABSTRACT

A dual purpose head cleaner for floppy disc drives, comprising, a jacket similar to the jacket of a normal floppy disc and having an abrasive disc disposed therein. A first pair of aligned slots are disposed through the jacket between the center opening and one edge and a second single slot is provided in one side of the jacket between the center opening and one other of the sides. When the jacket is inserted with the two holes leading, the cleaner can be used to clean a two head disc drive. With the single slot opening inserted first, the cleaner is adapted for cleaning a one head system while supporting the pressure pad against the jacket on the opposite side.

5 Claims, 11 Drawing Figures

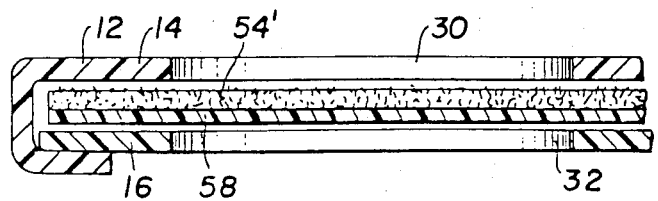
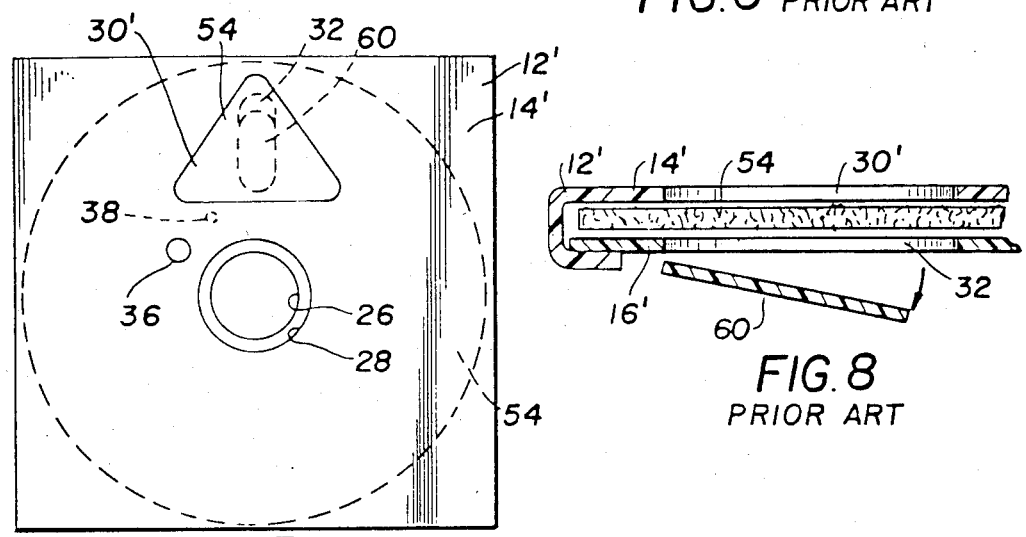
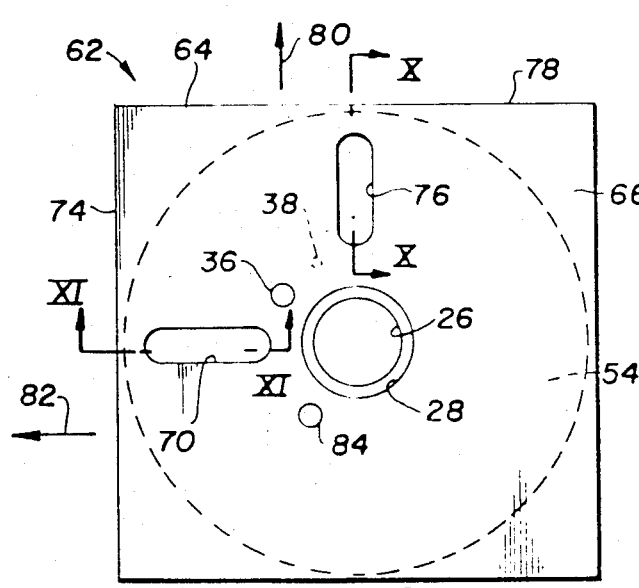
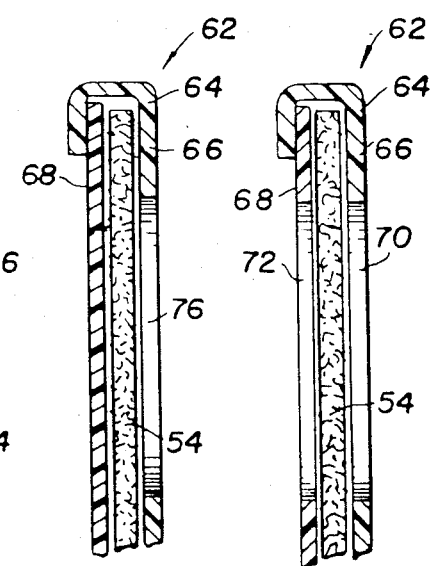
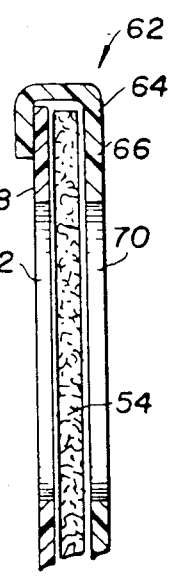

DUAL PURPOSE HEAD CLEANER

BACKGROUND OF THE INVENTION

The present invention relates to cleaners for cleaning the heads of devices reading from moving magnetic mediums and, more particularly, to a head cleaner for cleaning the heads of the floppy disc drive system.

A typical floppy disc, generally indicated as 10, is shown in FIG. 1 and in partially cut away enlarged view in FIG. 2. Disc 10 comprises a jacket 12 comprising opposed covering sheets 14 and 16 with a plastic disc 18 having magnetic surfaces 20 and 22 thereon disposed within the jacket 12 for rotation. The covering sheets 14, 16 of the jacket 12 are of a resiliently flexible material, as is the disc 18, thereby leading to the designation "floppy" disc. The jacket 12 is assembled with the disc 18 therebetween and then sealed about the edges as by folding sheet 16 over sheet 14 and sealing the two together in the area designated as 24 in a heat sealing process known in the trade as staking.

The disc 18 has a circular hole 26 in the center thereof. The covering sheets 14, 16 of the jacket 12 have circular holes 28 concentrically disposed with relation to the hole 26 and slightly larger than hole 26. In operation, the jacket 12 is inserted with one edge leading through a slot into the disc drive mechanism. When the mechanism is closed, the jacket 12 is retained therein and, simultaneously, a drive hub engages the circular hub hole 26 and grips the disc 18. The disc 18 is then rotated within the jacket 12 by the drive hub.

To provide for the reading and writing operations, a pair of opposed slots 30 and 32 are disposed in the jacket 12 through both covering sheets 14, 16 between the hub holes 26, 28 and one side of the jacket, labelled 34. Side 34 then becomes the leading side or edge which is inserted first into the disc drive mechanism. A pair of small opposed holes 36 are provided through the sheets 14, 16 adjacent the hub holes 26, 28. The disc 18 contains a small timing hole 38 therethrough. As the disc 18 rotates, the hole 38 passes between the holes 36 once in every revolution. Within the disc drive unit is a light source on one side of the disc 18 and a light sensing source on the opposite side. Each time the hole 38 passes between the holes 36, light is allowed to pass therethrough from the light source to the light sensing device. Thus, a positional timing signal is developed for use in determining the sector positions on the magnetic surfaces 20, 22 of the disc 18, as it rotates.

The floppy disc 10 can be used interchangebly in both one head and two head systems. This is shown in FIGS. 3 and 4, respectively. In a one head system, one head 40 moves through the slot 30 in and out in the direction of arrow 42. Simultaneously, a pressure pad 44 moves in and out in the direction of arrow 46. The pressure pad 44 has a felt pad 48 on the inner end thereof. When the locking mechanism of the disc drive is released so that the floppy disc 12 can be removed, the head 40 and pressure pad 44 move out of the slots 30, 32, respectively, to allow the floppy disc 10 to be withdrawn. When the disc 10 is inserted and the locking mechanism activated, the head 40 and pressure pad 44 move in through the slots 30, 32 to contact the magnetic surfaces 20, 22 of the disc 18. In this regard, the head 40 and pressure pad 44 act in much the same manner as the head and pressure pad of a cassette type tape system. The pressure pad 44 holds the magnetic surface 20 against the face of head 40 while the felt pad 48 slides smoothly over the magnetic surface 22.

In a two headed system such that of FIG. 4, a second head 50 is added, disposed on the opposite side of the disc 18 from the head 40. The first head 40 moves in and out in the direction of arrow 42 in the manner previously described with respect to FIG. 3. The head 50 moves in and out in the direction of arrow 52 in a similar manner.

With the earlier so-called "hard" disc drives, the heads floated over the magnetic surface of the disc on a thin film of air. Consequently, there was no contact between the head and the oxide material on the magnetic surface and, therefore, no transfer of the magnetic surface to the head. By contrast, the heads of a floppy disc system are prone to a build up of transferred magnetic material in the same manner as the heads of a cassette type tape system. Since a buildup of magnetic material on the face of the head can interfere with proper operation of the device, the heads must be kept clean. One alternative is to disassemble the mechanism and hand-clean the head with a rag and solvent. Such an approach is, however, not the optimal solution.

To solve this problem in cassette tape players, a cleaning device was provided by substituting an abrasive tape for the recording tape in the same type of cassette housing and drive mechanism. Such a device is shown in the German Pat. No. 2,301,533 to Polygram GmbH of Hamburg, Germany. The abrasive tape used is only mildly abrasive so as to wipe the oxide coating from the head surface without damaging the head. The tape is made of an absorbant material as well so that, additionally, the tape can be partially saturated with a suitable solvent such as isopropyl alcohol, or the like, to help in the cleaning process. In use, the tape of the cleaning cassette is partially moistened with solvent and then the cassette is inserted into the cassette player and operated in the normal manner. As the tape moves across the head, it wipes any oxide coating therefrom.

Adapting the above-described teaching method for cassettes to floppy disc drives was a simple and straight-forward transition. Such a device is shown in cross section in FIG. 5 in the area corresponding to that of FIG. 2. As with the cassette system, substantially the same jacket 12 as for the floppy disc 10 comprising cover sheets 14, 16 and with openings 30, 32 therein is employed. In similar manner to the cassette system, the magnetic disc 18 is simply replaced with a cleaning disc 54 of the same resiliently flexible abrasive material, which is readily adaptable for rotation within the jacket 12 by the drive mechanism of the floppy disc drive in the same manner as the magnetic disc 18.

Such as approach worked adequately with the two head system of FIG. 4; but, with the one head system of FIG. 3, the abrasive cleaning disc 54 had an adverse effect on the felt pad 48 of the pressure pad 44 which was intended to slide on a smooth surface. Accordingly, a one headed cleaning disc was developed such as that shown in FIG. 6. The cleaning disc of FIG. 6 is representative of several patented designs including those of Allan (U.S. Pat. No. 4,180,840), Masuyama et al. (U.S. Pat. No. 4,106,067) and Sugisaki et al. (U.S. Pat. No. 4,065,798). In this dedicated single head cleaner, the same jacket 12 is one again used; however, in this case, a composite cleaning disc 56 is employed. One side of the disc comprises a cleaning disc 54' substantially identical to the cleaning disc 54 of FIG. 5, which is bonded to a disc of plastic material 58 or the like, over which the felt pad 48 is adapted to slide smoothly or the one side while the head is cleaned on the other side by the cleaning disc 54'.

Thus, it can be seen that the prior art cleaning disc of FIG. 5 is adapted for cleaning only a two headed disc system while the prior art cleaning disc of FIG. 6 is adapted for cleaning only a one headed system.

More recently, Davis, in U.S. Pat. No. 4,374,404, has patented the cleaning disc shown in simplified form in FIGS. 7 and 8, which is a partial solution to the problem. In the Davis approach, the simple cleaning disc 54 of FIG. 5 is employed and the jacket is modified. The jacket 12' uses one covering sheet 14' with an opening 30' therein. The opening 30' of the Davis apparatus is enlarged for other reasons which are the subject of another application. The opening 30' could be of the same shape as the opening 30 in the previously discussed embodiment. The opposed opening 32 in the opposite covering sheet 16' is filled with a perforated tab 60 at the time of manufacture, puchase, and delivery. At the time of use, if the Davis cleaning disc is to be employed in a one headed system such as that of FIG. 3, the perforated tab 60 is left in place and the pressure pad 44 and felt pad 48 thereof press against the tab 60 rather than the bottom surface of the cleaning disc 54. If the Davis cleaning disc is to be used in a two headed disc drive, the perforated tab 60 is removed to expose the full length of the slot opening 32 to the second head in the manner of FIG. 4. It will be appreciated that the cleaning disc of Davis can be used for single head unit cleaning and then be converted to two head unit cleaning; but, once the perforated tab 60 has been removed, the Davis cleaning disc is substantially identical to the prior art disc of FIG. 5 and, therefore, can no longer be used for a single headed system.

Wherefore, it is the object of the present invention to provide a cleaning disc for floppy disc drives which is simple in structure and which can be used interchangeably for one headed and two headed drives.

SUMMARY

The foregoing objectives have been met in the dual-purpose head cleaner for a floppy disc drive of the present invention comprising a square jacket having opposed sheets of resiliently flexible material; and, a cleaning disc of resiliently flexible abrasive material adapted to clean but not damage a disc drive head rotatably disposed within the jacket, the cleaning disc having a central opening adapted to receive the drive hub of the disc drive; wherein, the jacket has the following openings therein disposed as follows when the jacket is operably inserted within the disc drive; first, a centrally located opening through both sheets of the material for access of the drive hub of the disc drive to the cleaning disc; second, a pair of opposed openings through both sheets of the material aligned to provide access therethrough to the cleaning disc for two opposed heads when the jacket is inserted into the disc drive in a first orientation; and third, a single opening through only one sheet of the material aligned to provide access therethrough to the cleaning disc for one head when the jacket is inserted in the disc drive in a second orientation.

DESCRIPTION OF THE DRAWINGS

FIG. 6 is a similar simplified cutaway drawing through a cleaning disc of the prior art in a second embodiment.

FIGS. 7 and 8 are simplified and partially cutway drawings of a third embodiment of a cleaning disc according to the prior art.

FIG. 9 is a plan view of the cleaning disc according to the present invention.

FIG. 10 is a simplified cutaway drawing through the disc of FIG. 9 in the plane X—X.

FIG. 11 is a simplified cutaway drawing through the disc of FIG. 9 in the plane XI—XI.

DESCRIPTION OF THE PREFERRED EMBODIMENT

Figure 1:
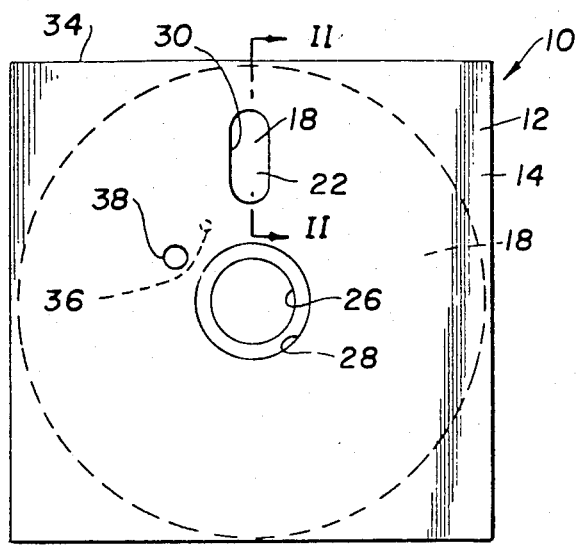
FIG. 1 is a plan view of a floppy disc shown in simplified form.
Figure 2:
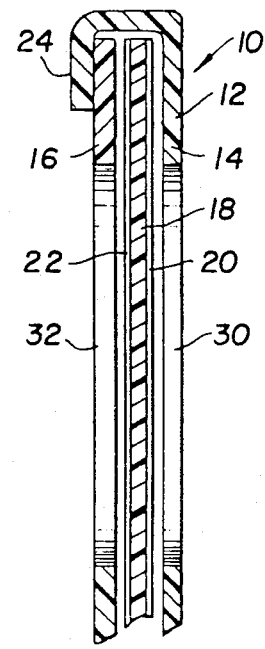
FIG. 2 is an enlarged cutaway drawing through the floppy disc of FIG. 1 and the plane I—I.
Figure 3:
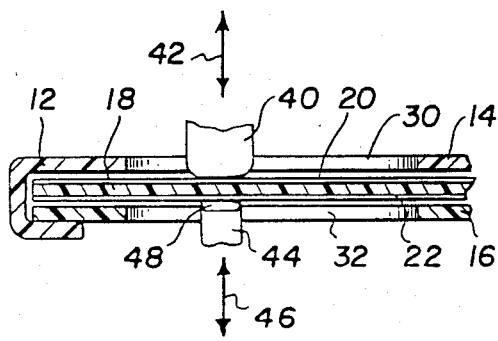
FIG. 3 is a simplified drawing showing how a one headed drive system contacts the disc of a floppy disc.
Figure 4:
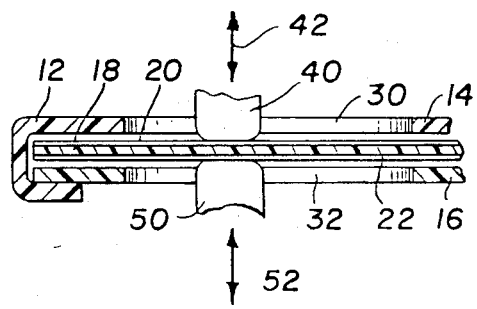
FIG. 4 is a simplified drawing showing how two opposed heads in a two headed drive system contact opposite sides of the disc of FIG. 1.
Figure 5:
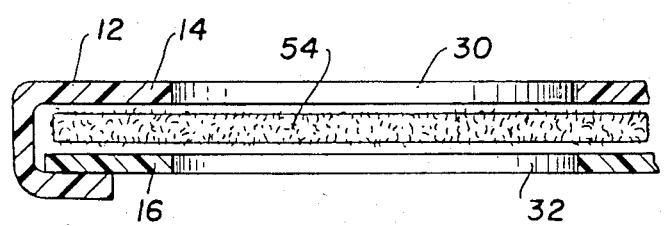
FIG. 5 is an enlarged, simplified, cutaway drawing through a portion of a cleaning disc according to one embodiment of the prior art.

The dual purpose head cleaner of the present invention is generally indicated as 62 in FIGS. 9-11. Head cleaner 62 comprises a jacket 64 substantially like that described with respect to FIG. 1 containing a cleaning disc 54 therein such as that described with respect to FIG. 5. As with the jacket 12 of FIG. 1, jacket 64 comprises convering sheets 66 and 68 with the cleaning disc 54 disposed therebetween. A first pair of opposed slot openings 70 and 72 are disposed through the sheets 6, 68 between the hub opening 28 and side 74 of jacket 64. An additional, single slot opening 76 is disposed in sheet 66 between the hub opening 28 and one other side 78. This unique arrangement can be seen in greater detail in FIGS. 10 and 11. It should be readily understood that if side 78 is inserted into the disc drive in the direction arrow 80 with side 78 as the leading edge, the head cleaner 62 is adapted for cleaning a one head system, since the head will pass through opening 76 to contact the abrasive disc 54 while the pressure pad 44 will contact the covering sheet 68. By contrast, if the head cleaner 62 is rotated 90° and side 74 made the leading edge to be inserted in the direction of arrow 82, the two opposed openings 70, 72 will be positioned under the heads to allow access thereof to respective sides of the cleaning disc 54. While the openings 70, 72 and 76 could be oriented at 180° with respect to one another, the 90° orientation as shown in FIG. 9 is preferred, since the jacket 64 can be grasped in opposition to respective ones of the openings for insertion without touching the cleaning disc 54.

The prior art head cleaners described herein were all intended to be inserted into the disc drive system in only one orientation. Consequently, only one set of timing holes 36, 38 were included to provide the necessary signals for the disc drive system. In the preferred embodiment of head cleaner 62 of the present invention, it will be noted that a second pair of opposed holes 84 are provided through the jacket 64 to provide proper alignment with the timing apparatus of the disc drive system when the head cleaner 62 is inserted in the second orientation.

Thus, it can be seen from the foregoing description that the head cleaner of the present invention is truly a dual purpose head cleaner in that it can be alternatively used with one or two head disc drive systems for the life of the cleaner. Moreover, whereas the prior art systems require complicated components which are harder and more costly to manufacture, the head cleaner of the present invention is of a simple and straighforward design which is both easy and inexpensive to manufacture.

Wherefore, having thus described our invention, we claim:

1. A dual-purpose head cleaner for a floppy disc drive comprising:
    (a) a square jacket comprising opposed jacket sheets of resiliently flexible material;,
    (b) a cleaning disc of resiliently flexible abrasive material adapted to clean but not damage a disc drive head, said disc being adapted to be rotated within said jacket, said disc having a central opening adapted to receive a drive hub of the disc drive;
    (c) said jacket having openings therein disposed as follows when said jacket is operably inserted within a disc drive;
    centrally aligned openings through both of said jacket sheets to provide access of the drive hub of the disc drive to said cleaning disc;
    a pair of opposed openings through both jacket sheets aligned to provide access therethrough to said cleaning disc for two opposed heads when said jacket is inserted in the disc drive in a first orientation; and,
    a single opening through only one jacket sheet aligned to provide access therethrough to said cleaning disc for one head when said jacket is inserted in the disc drive in a second orientation.

2. The head cleaner of claim 1 wherein additionally:
    (a) said jacket has a first pair of holes through both jacket sheets aligned with a floppy disc timing mark reader when said jacket is in said first orientation; and,
    (b) said jacket has a second pair of holes through both jacket sheets aligned with said timing mark reader when said jacket is in said second orientation.

3. In a head cleaner for a floppy disc drive comprising a rotatable cleaning disc of abrasive material disposed within a square jacket having two opposed cover sheets with the cleaning disc disposed therebetween and including a pair of opposed radial slots in the two cover sheets normal to a first edge of said cover sheets for access to the cleaning disc from both sides, the improvement to allow interchangeable use of the cleaning disc on both one and two head drives, comprising;
    a single slot in only one of the cover sheets normal to a second edge of the jacket whereby when the jacket is inserted in the disc drive with said first edge leading, the cleaner is adapted to cleaning two heads and when the jacket is inserted in the disc drive with said second edge leading, the cleaner is adapted for cleaning one head.

4. The improvement to a head cleaner of claim 3 wherein additionally:
    (a) the jacket has a first pair of holes through both sheets aligned with a floppy disc drive's timing mark reader when the jacket is inserted with the one edge leading; and,
    (b) the jacket has a second pair of holes through both sheets aligned with said timing mark reader when the jacket is inserted with said one other edge leading.

5. In a dual purpose cleaner means for a floppy disc drive including a cleaning disc having a drive opening adapted to receive disc drive means, and a polygonal jacket means containing said disc and having openings cooperable with said drive opening; the provision of:
    said jacket means including a jacket sheets covering opposite side faces of said cleaning disc;
    each jacket sheet having a radially elongated slot adapted to receive a head on each side of said jacket means for cleaning;
    said elongated slots being oriented with respect to a first edge of said jacket means for orientation of said jacket means in a first direction;
    one of said jacket sheets having a radially elongated slot adapted to receive a head on the corresponding side of the jacket means,
    the last mentioned slot being oriented with respect to a second edge of the jacket means for orientation of said jacket means in a second direction, whereby said head cleaner means is adapted to clean one or two head disc drives by changing direction of insertion of said jacket means in accordance with said first and second edges of said jacket means.

* * * * *